(12) United States Patent
Hirose et al.

(10) Patent No.: US 10,036,984 B2
(45) Date of Patent: Jul. 31, 2018

(54) MANUFACTURING METHOD FOR PEELING MEMBER

(71) Applicant: NTN CORPORATION, Osaka (JP)

(72) Inventors: Kazuo Hirose, Mie (JP); Hiroshi Yanagawa, Mie (JP); Yuuki Yamazoe, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/537,861

(22) PCT Filed: Dec. 18, 2015

(86) PCT No.: PCT/JP2015/085467
§ 371 (c)(1),
(2) Date: Jun. 19, 2017

(87) PCT Pub. No.: WO2016/098879
PCT Pub. Date: Jun. 23, 2016

(65) Prior Publication Data
US 2017/0357195 A1 Dec. 14, 2017

(30) Foreign Application Priority Data
Dec. 19, 2014 (JP) .................................. 2014-257866

(51) Int. Cl.
*G03G 15/20* (2006.01)
*B23K 26/22* (2006.01)
*C09J 183/04* (2006.01)

(52) U.S. Cl.
CPC ......... *G03G 15/2028* (2013.01); *B23K 26/22* (2013.01); *G03G 15/2085* (2013.01); *C09J 183/04* (2013.01); *G03G 2215/2016* (2013.01)

(58) Field of Classification Search
CPC .................... G03G 15/2028; G03G 15/2085
See application file for complete search history.

(56) References Cited

U.S. PATENT DOCUMENTS

| 6,029,038 A | 2/2000 | Uehara |
|---|---|---|
| 2005/0117941 A1 | 6/2005 | Ohta |

FOREIGN PATENT DOCUMENTS

| CN | 1621962 A | 6/2005 |
|---|---|---|
| JP | 64-013179 A | 1/1989 |

(Continued)

OTHER PUBLICATIONS

International Search Report for PCT/JP2015/085467 dated Jan. 19, 2016.

(Continued)

*Primary Examiner* — Erika J Villaluna
(74) *Attorney, Agent, or Firm* — Hedman & Costigan, P.C.; James V. Costigan; Kathleen A. Costigan

(57) ABSTRACT

To provide a manufacturing method for a peeling member in which a non-adhesive resin film formed by fluororesin resin or the like is adhered to a metal plate, the method capable of manufacturing the peeling member which can prevent adhesion of a paper right after fixing for a long period of time with high productivity and without variations in quality. The manufacturing method for the peeling member provided with a peeling sheet 1a formed by a metal plate 2 and a non-adhesive resin film 4 adhered to the metal plate 2, the manufacturing method including a groove forming step of forming a pattern portion 5 formed by a plurality of recessed grooves on at least a part of a paper passing side surface of the non-adhesive resin film 4 along a longitudinal direction of the non-adhesive resin film 4.

5 Claims, 14 Drawing Sheets

(56) References Cited

FOREIGN PATENT DOCUMENTS

| | | |
|---|---|---|
| JP | 11-184300 A | 7/1999 |
| JP | 2001-235959 A | 8/2001 |
| JP | 2003-122173 A | 4/2003 |
| JP | 2003-122174 A | 4/2003 |
| JP | 2003-263059 A | 9/2003 |
| JP | 2005-181999 A | 7/2005 |
| JP | 2007-047379 A | 2/2007 |
| JP | 2011-043763 A | 3/2011 |

OTHER PUBLICATIONS

English Abstract for JP 2001-235959 A dated Aug. 31, 2001.
English Abstract for JP 2005-181999 A dated Jul. 7, 2005.
English Abstract for JP 2011-043763 A dated Mar. 3, 2011.
English Abstract for JP 2007-047379 A dated Feb. 22, 2007.
English Abstract for JP 2003-263059 A dated Sep. 19, 2003.
English Abstract for CN 1621962 A dated Jun. 1, 2005.
English Abstract for JP 2003-122174 A dated Apr. 25, 2003.
English Abstract for JP 2003-122173 A dated Apr. 25, 2003.
English Abstract for JP 11-184300 A dated Jul. 9, 1999.
English Abstract for JP 64-013179 A dated Jan. 18, 1989.

(a)

(b)

(a)

(b)

MANUFACTURING METHOD FOR PEELING MEMBER

TECHNICAL FIELD

The present invention relates to a manufacturing method for a peeling member which peels a paper from a fixing member such as a fixing roller and a fixing belt arranged in an electronic photographic device such as a copying machine and a laser printer.

BACKGROUND ART

In an electronic photographic device such as a copying machine and a laser printer, a thermal fixing device which develops an electrostatic latent image formed on a photoreceptor drum on a paper by using a developing agent such as toner and then fixes the developed image is arranged. The thermal fixing device is provided with a fixing member such as a fixing roller and a fixing belt for fixing the developing agent on a paper by heating and melting and pressing the developing agent.

In the fixing member or a pressing roller which presses the fixing member against a paper, a sheet-like peeling member which peels a paper on which the developing agent is fixed from the roller or the like is used in order to prevent the paper from winding around the roller and interrupting smooth operation of the roller. For example, in a peeling member disclosed in Patent Document 1, a fluororesin film is folded and adhered to a distal end portion of a metal plate via a silicon adhesive, and a distal end of the film is arranged adjacent to an outer circumference surface of the roller. The film scoops an edge of a paper and thereby the paper is prevented from winding around the roller. Further, such a peeling member with the fluororesin film adhered is manufactured, for example, by using a manufacturing method, a device or the like disclosed in Patent Document 2. According to the manufacturing method and the device, the fluororesin film can be folded and adhered to the distal end portion of the metal plate to be adjacent to the fixing member while suppressing existence of a crinkle or an air bubble as much as possible.

PRIOR ART DOCUMENTS

Patent Documents

Patent Document 1: JP 2001-235959 A
Patent Document 2: JP 2005-181999 A

SUMMARY OF THE INVENTION

Problems to be Solved by the Invention

However, in the developing agent adopted in an electronic photographic device of recent years, in order to improve color developing performance, binder resin as one component of toner is changed to polyester binder resin with high transparency. The toner containing polyester binder resin has extremely high adhesiveness and therefore even if the peeling member with a fluororesin film adhered without forming a crinkle as disclosed in Patent Document 1 and Patent Document 2 is used, a paper might be adhered to the peeling member. Especially, the paper is easily adhered to the distal end portion of the peeling member which contacts with a paper right after the fixing. High resolution, high printing speed, compactification, complexness of a flow of a paper caused by installation of a both-side copying function, or the like in the electronic photographic device is promoted in recent years, and when a paper is slightly adhered (attracted) to the peeling member, jamming or folding of a paper is generated and therefore a desired operation quality might not be maintained.

As a method for preventing this, it is considered to subject the distal end portion of the metal plate as a base member to emboss-processing in order to reduce a contact area with a paper by arranging an embossed shape on a paper passing side surface. However, in this case, since a part adjacent to the distal end portion of the metal plate is processed, productivity or deviation in quality such as horizontal accuracy might be deteriorated.

An object of the present invention is, in order to solve such a problem, to provide a manufacturing method for a peeling member in which a non-adhesive resin film formed by fluororesin resin or the like is adhered to a metal plate, the method capable of manufacturing the peeling member which can prevent adhesion of a paper right after fixing for a long period of time with high productivity and without variations in quality.

Means for Solving the Problem

A manufacturing method for a peeling member according to the present invention is a manufacturing method for a peeling member provided with a peeling sheet formed by a metal plate and a non-adhesive resin film adhered to the metal plate, the peeling member peeling a paper from a fixing member of an electronic photographic device by making a distal end portion, which is an end portion at a side of one of long sides of the peeling sheet, contact with or close to the fixing member. The manufacturing method includes a groove forming step of forming a plurality of recessed grooves on at least a part of a paper passing side surface of the non-adhesive resin film along a longitudinal direction of the non-adhesive resin film before the non-adhesive resin film is adhered to the metal plate, and a film adhering step of adhering the non-adhesive resin film obtained in the groove forming step such that the recessed grooves are arranged along at least a longitudinal direction of the distal end portion of the paper passing side surface of the metal plate.

Here, "contact with" means that one side (the distal end portion) of the peeing sheet is linearly contacted with the fixing member such as a roller in an axial direction. Further, "close to" means that the one side (the distal end portion) of the peeling sheet is arranged close to the roller such that a paper can be prevented from winding around the roller or the like. Further, the fixing member denotes a member formed in either of a roller-like shape, a film-like shape, or a belt-like shape capable of contacting with a paper in a step of heating and at the same time pressing an undeveloped developing agent on a paper so as to be fixed on the paper. For example, the fixing member includes a fixing roller, a pressing roller, a fixing belt and the like.

The groove forming step is a step of interposing and continuously pressing the non-adhesive resin film by a rubber roller and a rotation member, which can transfer the recessed groove, to form the recessed grooves.

An outer circumference surface of the rotation member is formed in a helical gear shape, and the recessed grooves are formed by linear grooves transferred from the helical gear shape to be inclined along a certain direction against a paper passing direction and arranged at certain intervals.

The manufacturing method includes a step of cutting the non-adhesive resin film having a shape in which the recessed grooves are arranged along the longitudinal direction of the distal end portion from a continuous film material in which the recessed grooves are formed after the groove forming step and before the film adhering step.

The non-adhesive resin film has an adhesive layer on an opposite paper passing side surface. The film adhering step is a step of adhering the non-adhesive resin film, after arranging a distal end portion of the metal plate at a side of the adhesive layer of the non-adhesive resin film such that an end portion of the non-adhesive resin film is protruded from the distal end portion of the metal plate, by pushing the distal end portion of the metal plate together with the non-adhesive resin film into a gap between two flexible bodies adjacent to each other to cover both surfaces of the distal end portion of the metal plate.

Effect of the Invention

The manufacturing method for the peeling member according to the present invention includes the groove forming step of forming a plurality of the recessed grooves on at least a part of the paper passing side surface of the non-adhesive resin film along the longitudinal direction of the non-adhesive resin film before the non-adhesive resin film is adhered to the metal plate, and the film adhering step of adhering the non-adhesive resin film obtained in the groove forming step such that the recessed grooves are arranged along at least the longitudinal direction of the distal end portion of the paper passing side surface of the metal plate, and thereby the recessed grooves are formed at a film side along the longitudinal direction in advance and emboss-processing or the like onto a metal side is not necessary, and therefore excellent productivity is provided, and horizontal accuracy (straightness accuracy) of the distal end portion of the peeling sheet can be maintained at a high level, and variation in quality is less. The peeling member obtained by the manufacturing method has the recessed grooves formed on the paper passing side surface, and thereby a contact area between the surface of the non-adhesive resin film and a paper made be small at the distal end portion of the peeling sheet contacted with a paper right after fixing, and therefore excellent low friction characteristic is provided and adhering of a paper right after the fixing can be prevented for a long period of time. With this, jamming or folding of a paper can be prevented and excellent durability can be provided.

The groove forming step is a step of interposing and continuously pressing the non-adhesive resin film by the rubber roller and the rotation member which can transfer the recessed groove to form the recessed grooves, and thereby especially excellent productivity is provided.

The outer circumference surface of the rotation member is formed in the helical gear shape, and the recessed grooves are formed by the linear grooves transferred from the helical gear shape to be included along a certain direction against the paper passing direction and arranged at certain intervals, and thereby especially excellent low friction characteristic is provided, and adhering of a paper right after fixing can be prevented. Further, contact with a paper becomes linear contact and image deterioration such as unevenness, a stripe of an image can be prevented.

Since the step of cutting the non-adhesive resin film having the shape in which the recessed grooves are arranged along the longitudinal direction of the distal end portion from the continuous film material in which the recessed grooves are formed after the groove forming step and before the film adhering step is adopted, a peeling member with high quality can be manufactured.

The non-adhesive resin film has the adhesive layer on the opposite paper passing side surface, and the film adhering step is a step of adhering the non-adhesive resin film, after arranging the distal end portion of the metal plate at the side of the adhesive layer of the non-adhesive resin film such that the end portion of the non-adhesive resin film is protruded from the distal end portion of the metal plate, by pushing the distal end portion of the metal plate together with the non-adhesive resin film into the gap between the two flexible bodies adjacent to each other to cover the both surfaces of the distal end portion of the metal plate, and thereby existence of a crinkle or an air bubble on the resin film can be suppressed as much as possible. Further, even if a projection is formed at a side of the adhered surface, the resin film can be adhered. Further, since an automatic adhering machine having a high price and a large structure is not necessary, the peeling member can be manufactured at low cost.

MODE FOR CARRYING OUT THE INVENTION

Figure 1:
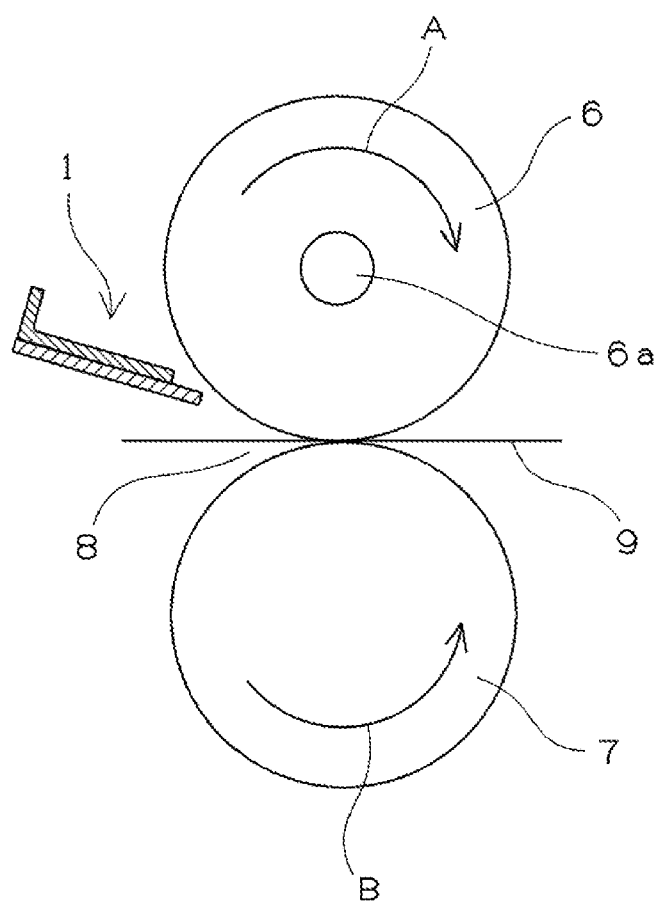
FIG. 1 is a schematic view of a fixing device using a peeling member obtained by a manufacturing method according to the present invention.

A fixing device using a peeling member obtained by a manufacturing method according to the present invention is described with reference to FIG. 1. FIG. 1 is a schematic view of a heat roller type fixing device using a peeling member. The fixing device is provided with a fixing roller 6 in which a heater 6a is installed, the fixing roller 6 rotated in a direction of an arrow A, a pressing roller 7 rotated in a direction of an arrow B while contacting with the fixing roller 6, and a peeling member 1 arranged adjacent to a nip portion 8 formed when the fixing roller 6 and the pressing roller 7 are contacted with each other. A toner image formed on a paper 9 is fixed at the nip portion 8 and turned into a fixed image. In order to peel the paper 9 passed through the nip portion 8 from fixing roller 6, the peeling member 1 is arranged to be contacted with or to be close to the fixing roller 6.

Figure 2:
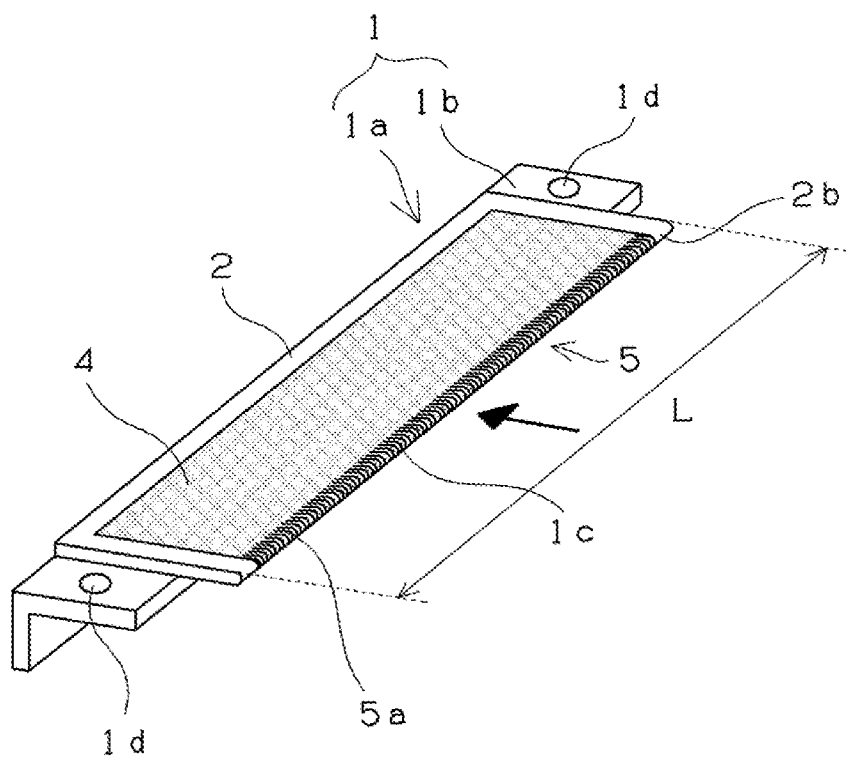
FIG. 2 is a perspective view illustrating one example of the peeling member obtained by the manufacturing method according to the present invention.

One example of the peeling member obtained by the manufacturing method according to the present invention is described with reference to FIG. 2, and FIGS. 3(a) and 3(b). FIG. 2 is a perspective view of the peeling member. As shown in FIG. 2, the peeling member 1 is provided with a peeling sheet 1a, and a support member 1b which supports and fixes the peeling sheet 1a. The peeling sheet 1a is formed by adhering a non-adhesive resin film 4 on a metal plate 2 having a substantially rectangular shape in a plane view. A black arrow in the figure indicates a paper passing direction, and a longitudinal direction of the peeling sheet 1a is orthogonal to the paper passing direction. In the peeling sheet 1a and the metal plate 2, a paper passing side surface is opposite to a surface supported and fixed by the support member 1b. A distal end portion 1c, which is an end portion at an upstream side in the paper passing direction of the peeling sheet 1a of the peeling member 1, is arranged to be close to the fixing roller, and the distal end portion 1c scoops the end portion of a paper peeled from the fixing roller (see FIG. 1). In the peeling member 1, the distal end portion 1c, which is contacted with a paper right after the fixing, has a pattern portion 5 formed by a plurality of recessed grooves 5a arranged on a surface of the non-adhesive resin film 4 along a longitudinal direction the non-adhesive resin film 4.

Figure 3:
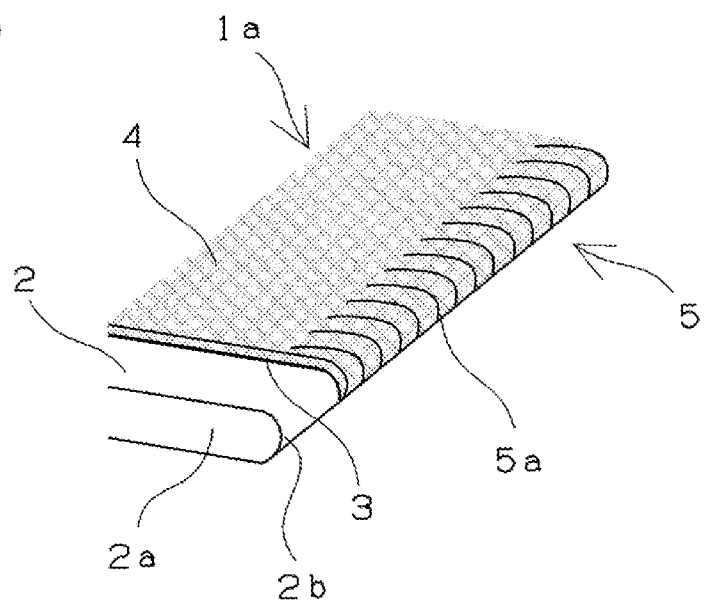
FIGS. 3(a) and 3(b) are a partially enlarged view and a cross-sectional view of a peeling sheet of the peeling member in FIG. 2.
Figure 3:
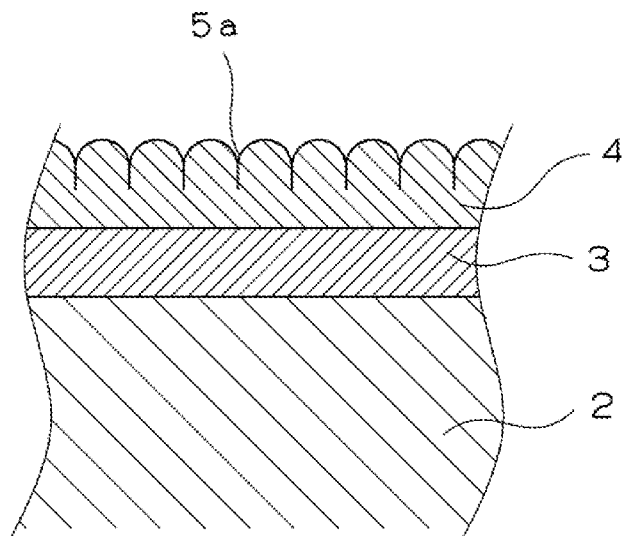

FIG. 3(a) is a partially enlarged perspective view of the peeling sheet of the peeling member, and FIG. 3(b) is a cross-sectional view in a longitudinal direction of the distal end portion of the distal end portion of the peeling sheet. As shown in FIG. 3(a) and FIG. 3(b), the non-adhesive resin film 4 is adhered to a surface of the metal plate 2 via an adhesive 3. The non-adhesive resin film 4 is adhered to the paper passing side surface of the metal plate 2 such that the recessed grooves 5a are arranged on at least the distal end portion 2a. With the non-adhesive resin film 4, a developing agent such as toner can be prevented from adhering when the developing agent is brought into slide-contact in a melting state. In a configuration shown in FIG. 3(a), the non-adhesive resin film 4 is folded and adhered to a front surface and a rear surface of the metal plate 2 so as to cover (wrap) the distal end portion at the upper stream side in the paper passing direction which is contacted with or close to the fixing member, and the recessed grooves 5a on the surface of the non-adhesive resin film 4 is arranged on the distal end portion 2a of the metal plate 2.

The distal end portion 2a of the metal plate 2 is, for example, a part having a width of 4 mm from a most distal end 2b toward a downstream side in the paper passing direction. The distal end portion 2a of the metal plate 2 defines a distal end portion 1c of the peeling sheet 1a. Further, the peeling sheet is formed to peel a paper by arranging the distal end portion so as to be contact with or close to the fixing member, and therefore the distal end portion of the peeling sheet is defined as an end portion at the upstream side in the paper passing direction and "the most distal end 2b" described above is defined as the most distal end point (fixing member side) in the distal end portion 2a.

The plurality of the recessed grooves 5a has a shape transferred from the rotation member in a groove forming step described below, and as described above, the recessed grooves 5a are arranged along at least the longitudinal direction of the distal end portion of the surface at the paper passing direction of the metal plate. A shape of the recessed groove (pattern part) is not especially limited as long as the shape can obtain a contact area to which a paper is not adhered, and therefore a straight linear shape along the paper passing direction, a straight linear shape inclined along a certain direction against the paper passing direction, a curved linear shape curved along the paper passing direction, or shapes separately arranged at regular intervals or irregular intervals (geometric pattern or the like) may be adopted.

Among these, as shown in FIG. 3(a) and FIG. 3(b), it is preferable that the recessed grooves are formed as linear grooves inclined along a certain direction against the paper passing direction and arranged at regular intervals. By adopting such a recessed groove shape, adhering of a paper right after fixing is easily prevented, and image deterioration such as unevenness, a stripe of an image can be prevented. A depth of the recessed groove is preferably set in a range between 20 and 80% of a thickness of the non-adhesive resin film. It is not preferable to set the depth of the recessed groove to be less than 20% of the thickness of the non-adhesive resin film because the effect which can prevent the adhering of a paper right after fixing is not enough, and it is not preferable to set the depth of the recessed grove to be more than 80% of the thickness of the non-adhesive resin film because strength of the non-adhesive resin film is made small and the film is broken or torn or handling performance is extremely deteriorated. Further, an interval (pitch) between the recessed grooves adjacent to each other is preferably set in a range between 0.1 and 2.0 mm. It is not preferable to set the interval of the recessed grooves to be less than 0.1 mm because the adhering of a thin paper cannot be prevented, and it is not preferable to set the interval between the recessed grooves to be more than 2.0 mm because a paper is caught by the recessed groove and jamming is generated.

In the non-adhesive resin film 4, a range in which the pattern portion 5 formed by the recessed grooves 5a is not especially limited as long as the range includes the distal end portion 2a of the metal plate 2, however it is preferable to set the range to cover a region between the most distal end 2b of the distal end portion 2a and a laser spot welding portion between the peeling sheet 1a and the support member 1b. By setting the range to cover the laser spot welding portion, it becomes possible to make countermeasures against failure of a linear image caused by a projection of the non-adhesive resin film 4 due to a welding mark of the laser spot welding. Further, the non-adhesive resin film 4 may be adhered to substantially the whole of the paper passing side surface including the distal end portion 2a of the metal plate 2 and the pattern portion 5 formed by the recessed grooves 5a may be formed on the whole surface, as needed.

As material of the metal plate 2, steel, aluminum, copper, stainless steel or the like may be used. Especially, stainless steel is preferable because stainless steel is not rust and processing of stainless steel is easy and stainless steel is low in cost. Further, it is preferable to set a thickness of the metal plate in a range between 50 and 300 µm. In a case in which the thickness of the metal plate is less than 50 µm, peeling force might not be secured, or the metal plate might be deformed in jamming. In a case in which the thickness of the metal plate is more than 300 µm, a paper to be peeled is abutted against the distal end portion of the peeling sheet and jamming might be generated. Further, the metal plate 2 has a contact width L (see FIG. 2) which is substantially the same as a length of the roller in an axial direction. With the contact width being large, contact pressure per unit area against the roller becomes small and therefore local wear of a surface of the roller can be prevented. Further, the length substantially the same as the length of the roller in the axial direction means the length which achieves the effect described above, and specifically the length may be more than substantially half of the length of the roller in the axial direction and the same as or slightly longer than the length of the roller in the axial direction.

As shown in FIG. 3(a) or the like, it is preferable that the distal end portion 2a of the metal plate 2 at the upstream side in the paper passing direction is formed in a curved surface without an edge in a thickness direction. Since the end portion is formed in a curved surface in the thickness direction, even if the end portion is contacted with the fixing member such as the fixing roller and the fixing belt in a pressing contact state with more than certain pressure, the surface of the fixing member is not damaged. Further, when the non-adhesive resin film is adhered by using a flexible body described below, the film can be prevented from being damaged. The curved surface described above may be machined after the metal plate is formed in a predetermined shape, however it is preferable that the metal plate is processed by means of press cutting which can apply pressure forming to the metal plate together with cutting at the same time.

As shown in FIG. 2, the support member 1b is formed by a metal thick plate, and holes 1d used for fixing the peeling member to a fixing device body or the like are formed at a left side and a right side in a longitudinal direction of the support member 1b. The metal plate 2 of the peeling sheet 1a and the support member 1b are joined by welding or the like. In the joining method, in order to prevent deterioration of horizontal accuracy of the distal end portion 2a due to shape change of the metal plate 2, it is preferable to adopt laser spot welding in which spot parts are formed parallel to the longitudinal direction. As material of the support member 1b, similar to the metal plate 2, steel, aluminum, copper, stainless steel or the like may be used. Stainless steel is preferable because of a similar reason to the metal plate. It is preferable to set a thickness of the metal thick plate which forms the support member 1b to be more than 0.8 mm in order to secure strength sufficiently for attaching the metal plate.

A manufacturing method for the peeling member according to the present invention is a method of manufacturing the peeling member provided with the peeling sheet formed by the metal plate and the non-adhesive resin film adhered to the metal plate as described above, and especially the method has a feature in a step of manufacturing the peeling sheet. That is, the manufacturing method according to the present invention includes (1) a groove forming step of forming a plurality of recessed grooves on at least a part of a paper passing side surface of the non-adhesive resin film along a longitudinal direction of the non-adhesive resin film before the non-adhesive resin film is adhered to the metal plate, and (2) a film adhering step of adhering the non-adhesive resin film obtained in the groove forming step such that the recessed grooves are arranged along at least a longitudinal direction of the distal end portion of the paper passing side surface of the metal plate.

(1) Groove Forming Step

Figure 4:
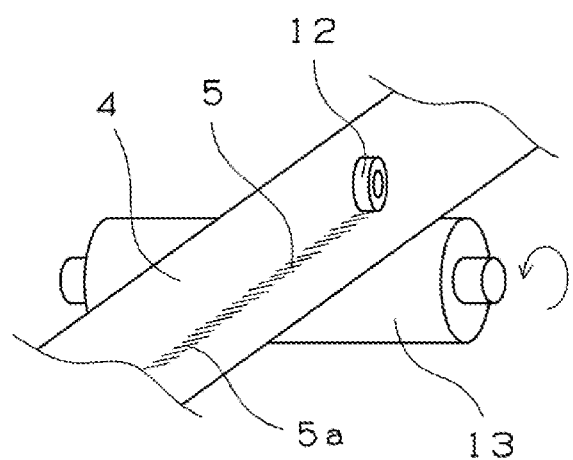
FIGS. 4(a) and 4(b) are views illustrating a groove forming step in the manufacturing method according to the present invention.
Figure 4:
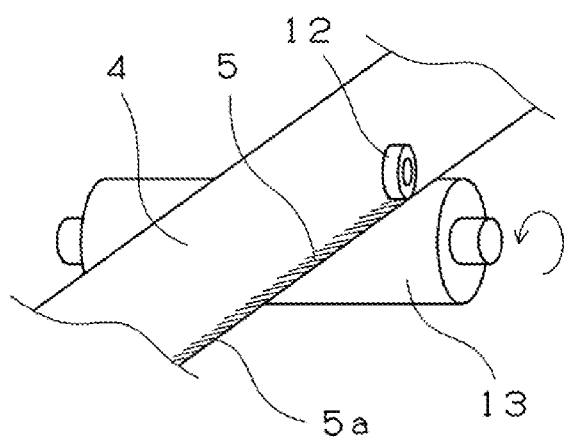

This step is for forming a plurality of the recessed grooves on at least a part of the paper passing side surface of the non-adhesive resin film along the longitudinal direction of the non-adhesive resin film before the non-adhesive resin film is adhered to the metal plate. A method of forming the recessed grooves is not especially limited, however it is preferable to adopt a method using a gear or a roller for transferring because excellent productivity is provided. FIGS. 4(a) and 4(b) illustrate one example of the groove forming step. FIGS. 4(a) and 4(b) are perspective views of the step of forming the pattern part of the recessed grooves shown in FIGS. 3(a) and 3(b). In FIG. 4(a), the non-adhesive resin film 4 is interposed by a urethane rubber roller 13 and a rotation member 12 and the rotation member 12 is continuously pressed against the urethane rubber roller 13 so as to form the recessed grooves 5a which forms the pattern portion 5. Here, rubber hardness of the rubber roller 13 is, for example, Shore A hardness of 95, and an added load is, for example, 5 kgf to 20 kgf. Further, the rotation member 12 is formed in, for example, a size having an outer diameter φ of 20 mm and a width of 5 mm, and an outer circumference surface of the rotation member 12 is formed in a helical gear shape. Since the recessed grooves 5a is formed by transferring of the shape, the pattern portion 5 has a shape formed by linear grooves inclined along a certain direction against the paper passing direction and arranged at regular intervals. At this time, a single film may be used as the non-adhesive resin film, or alternatively a film composite in which the non-adhesive resin film is coated with an adhesive and further a release paper is provided on the adhesive may be used.

A shape of the rotation member is matched with the shape of the recessed grooves (pattern portion) formed by the transferring. For example, in a case in which the shape of the pattern portion is formed in a straight linear shape along the paper passing direction, the straight linear shapes arranged at regular intervals, a normal gear shape in which a tooth is not inclined may be adopted.

The non-adhesive resin film is formed by a resin film having non-adhesiveness which can prevent adhering of the developing agent, and for example, a polyethylene resin film, a polypropylene resin film, and a film formed of well-known fluororesin such as polytetrafluoroethylene (PTFE) resin, tetrafluoroethylene-perfluoro alkyl vinyl ether copolymer (PFA) resin, tetrafluoroethylene-hexafluoropropylene copolymer (FEP) resin, tetrafluoroethylene-ethylene copolymer (ETFE) resin, polychlorotrifluoroethylene resin, chlorotrifluoroethylene-ethylene copolymer resin, polyvinylidene fluoride resin, and polyvinyl fluoride resin can be used. Especially, a fluororesin film formed of PTFE resin, PFA resin, FEP resin, or ETFE resin has excellent non-adhesiveness against color toner (toner using polyester binder resin or the like), and also has sufficient heat resistance. Further, the non-adhesive resin film may be formed of non-adhesive resin to which carbon fine powder such as Ketjen black and acetylene black is added as long as the non-adhesiveness against toner is secured, and this configuration can prevent deterioration of paper peeling performance due to static electricity.

A thickness of the non-adhesive resin film such as a fluororesin film is preferably set in a range between 10 and 200 μm, and more preferably set in a range between 40 and 80 μm. In a case in which the thickness is less than 10 μm, the non-adhesive resin film might be torn in forming the recessed grooves or the distal end portion of the metal plate might be exposed due to slight wear after adhering. Further, a crinkle is easily generated in a film adhering step described below, and therefore handling performance is deteriorated. In a case in which the thickness is more than 200 μm, the paper peeling performance might be deteriorated.

Further, even if the thickness of the non-adhesive resin film is set in the range described above, in a case in which an opposite roller (pressing roller) which interposes the non-adhesive resin film together with the rotation member provided with a helical gear shape is formed by a metal roller, the non-adhesive resin film might be torn in forming the recessed grooves. Against this, by adopting the rubber roller as described above as the opposite roller (the pressing roller), the tearing of the non-adhesive resin film can be prevented. The rubber hardness is not especially limited, however it is preferably set in a range of Shore A hardness between 50 and 100. Further, a load in the transferring is preferably set such that a depth of the recessed groove is in a range between 20 and 80% of the thickness of the non-adhesive resin film. Specifically, in a case in which a size of the rotation member has an outer diameter φ of 20 mm and a width of 5 mm, for example, the load is preferably set in a range between 5 kgf and 20 kgf. Further, it is likely that the depth of the recessed groove becomes shallow with time after the recessed groove is formed, however any problem in manufacturing and in use is not generated as long as the depth of the recessed groove after 48 hours since the peeling member according to the present invention is manufactured is in a range between 20 and 80% of the thickness of the non-adhesive resin film.

Figure 5:
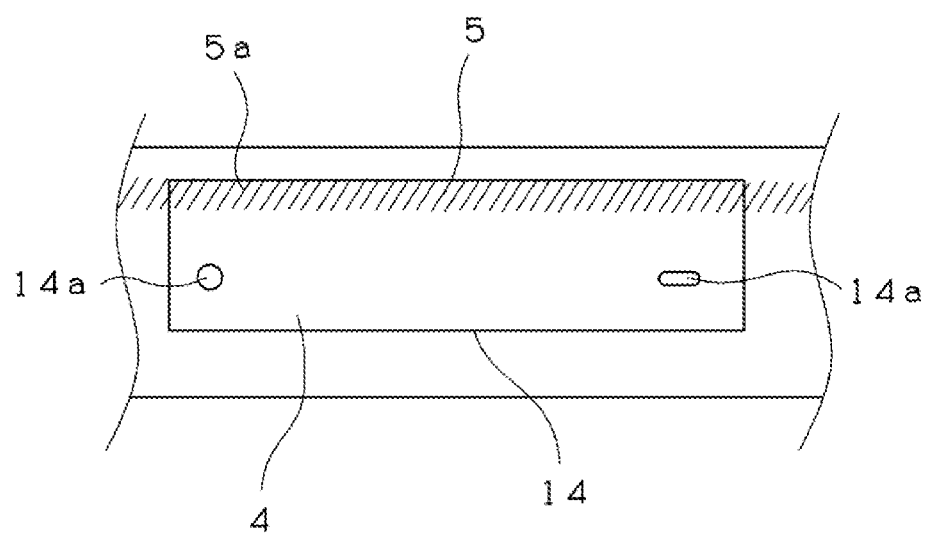
FIG. 5 is a schematic view illustrating cutting of a non-adhesive resin film from a continuous film material provided with a pattern portion formed by recessed grooves.

As shown in FIG. 5, the film provided with the recessed grooves obtained by the method in FIG. 4(a) can be used suitably for a film material from which the non-adhesive resin film is cut by unit of the peeling sheet. FIG. 5 is a schematic view illustrating cutting of the non-adhesive resin film from a continuous film material provided with the pattern portion formed by the recessed grooves. In FIG. 5, the non-adhesive resin film 4 having a shape in which the pattern portion 5 formed by the recessed grooves 5a to be arranged along the longitudinal direction of the distal end portion of the metal plate is cut from the continuous film material obtained in the groove forming step by a pressing die 14 provided with two reference holes 14a used in adhering the non-adhesive resin film 4 to the metal plate.

Figure 6:
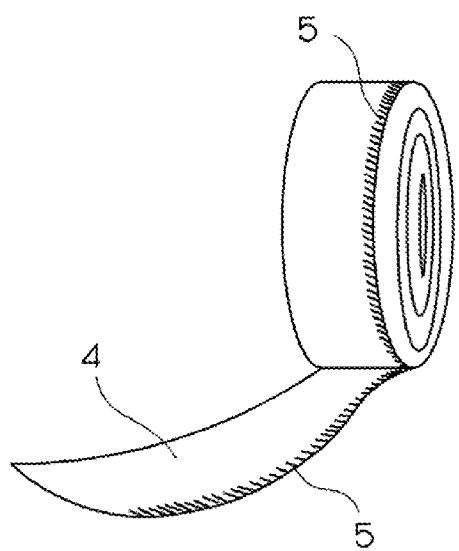
FIG. 6 is a perspective view illustrating a roll of the continuous film material provided with the pattern portion formed by the recessed grooves.

Further, a method in FIG. 4(b) is similar to the method in FIG. 4(a), and an arrangement of the rotation member 12 is the only difference. Specifically, the rotation member 12 is arranged at one end portion of the non-adhesive resin film 4 having a predetermined width, and the pattern portion 5 formed by the recessed grooves 5 is formed in the one end portion. Further, as shown in FIG. 6, the film material may be formed as a roll-like wound material. The non-adhesive resin film 4 is formed by an extremely thin film and the pattern portion 5 can be visible from a surface opposite to a surface in which the pattern portion 5 is formed. The roll is installed into an automatic adhering machine for example disclosed in Patent Document 2, and the roll can be adhered such that the pattern portion in the one end portion is arranged along the longitudinal direction of the distal end portion of the metal plate in the film adhering step described below.

(2) Film Adhering Step

Figure 7:
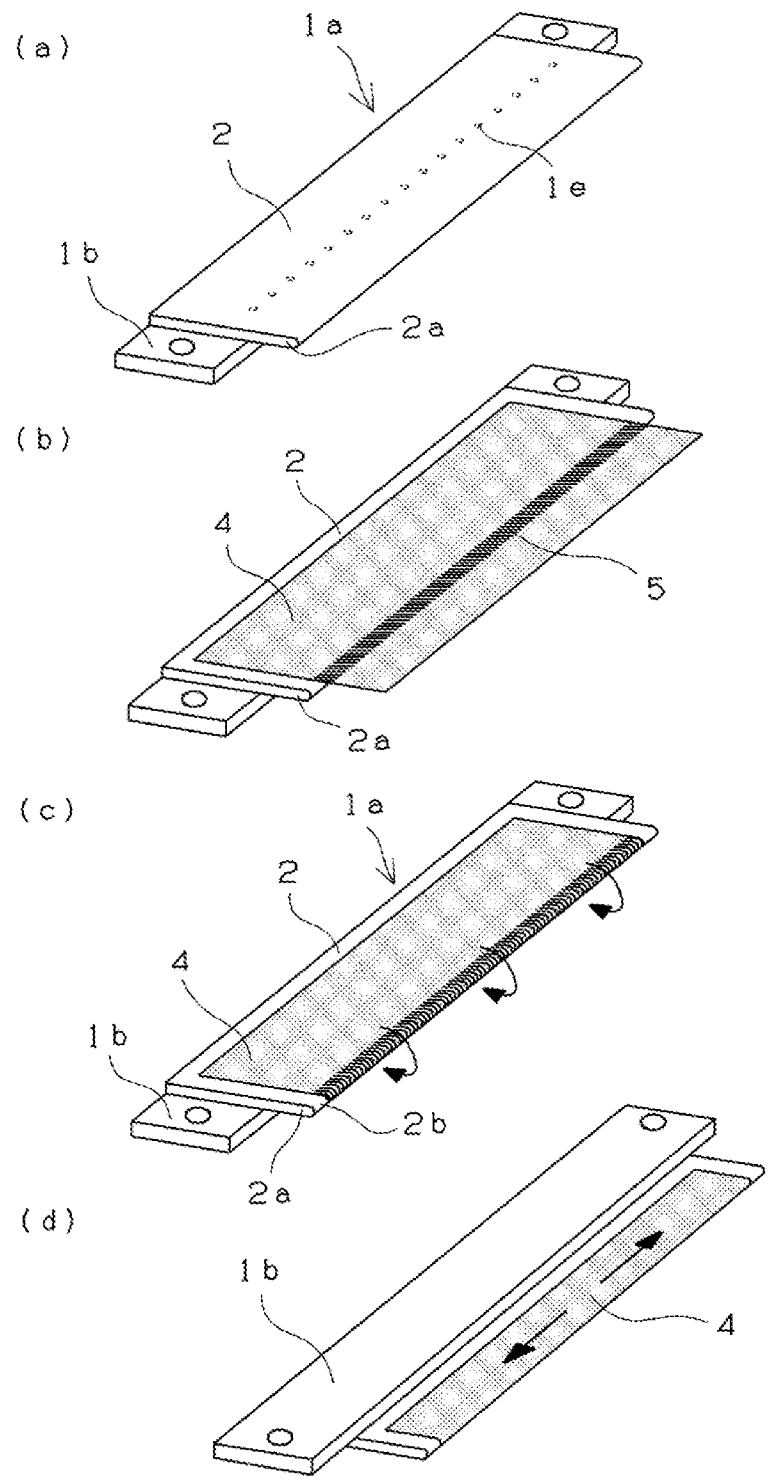
FIGS. 7(a) to 7(d) are views illustrating one example of a film adhering step in the manufacturing method according to the present invention.

This is for adhering the non-adhesive resin film obtained in the groove forming step such that the recessed grooves are arranged along at least the longitudinal direction of the distal end portion of the paper passing side surface of the metal plate. FIGS. 7(a) to 7(d) illustrate one example of the film adhering step. At first, as shown in FIG. 7(a), the metal plate 2 joined to the support member 1b by means of laser spot welding while leaving a free end portion is prepared. A reference numeral 1e corresponds to a welding mark of the laser spot welding. Next, as shown in FIG. 7(b), the non-adhesive resin film 4 having an adhesive layer on an opposite paper passing side surface provided as an adhered surface to metal plate 2, on which the pattern portion 5 is formed on the paper passing side surface is adhered without pulling both sides in the longitudinal direction of the non-adhesive resin film 4 while leaving a non-adhered part at the end portion in a width direction of the non-adhesive resin film 4 and pressing in the longitudinal direction of the non-adhesive resin film 4. Here, the non-adhesive resin film 4 is positioned such that the pattern portion 5 formed by the recessed grooves is arranged along the longitudinal direction of the distal end portion 2a of the paper passing side surface of the metal plate 2. Next, as shown in FIG. 7(c), the non-adhered part in the width direction of the non-adhesive resin film 4 is folded toward a rear surface via the most distal end 2b of the metal plate 2 and temporarily adhered without pulling the both sides in the longitudinal direction of the non-adhesive resin film 4. At last, as shown in FIG. 7(d), a temporarily adhered part is adhered while pressing in the longitudinal direction from substantially center portion in a length direction of the non-adhesive resin film 4 as a starting point so as to be fixed to the rear surface.

In the adhering of the non-adhesive resin film to the metal plate, as described above, it is preferable to be performed while interposing an adhesive, especially a silicon adhesive, between the adhered surfaces. Example of the silicon adhesive includes an adhesive obtained by condensing copolymer formed by an $SiO_2$ unit and a $(CH_3)_3SiO$ unit, and diorganopolysiloxane raw rubber. By interposing the silicon adhesive, the non-adhesive resin film is firmly adhered to the metal plate, and an adhering effect can be maintained in a fixing temperature, and a cushioning effect caused by the adhesive can be expected. In addition, it is preferable to apply surface treatment such as corona discharge treatment, sputter etching treatment, plasma etching treatment, TOS treatment by metallic sodium, ultraviolet irradiation treatment to the adhered surface toward the metal plate in order to enhance the adhering effect.

A thickness of a silicon adhesive layer is preferably set in a range between 5 and 50 μm. In a case in which the thickness is less than 5 μm, the adhering effect might not be obtained sufficiently. Further, in a case in which the thickness is more than 50 μm, paper peeling performance might be deteriorated because a thickness of the whole of the peeing member becomes relatively large. Further, the adhering of the non-adhesive resin film to the metal plate may be performed without interposing the adhesive. For example, a method in which the non-adhesive resin film is heated and pressed after the adhered surface (surface of the metal plate) is roughened by applying plasma etching treatment or the like may be adopted.

In a case in which the non-adhesive resin film in which the recessed grooves are formed on the surface by means of transferring and pressing as in the present invention is used, slight waviness might be generated, and therefore it is not easy to position the recessed grooves when folding and adhering, compared to a case in which a conventional film without the recessed grooves similar to the non-adhering resin film described above. A step more suitable to the film adhering step is described with reference to FIG. 8 to FIG. 14.

Figure 8:
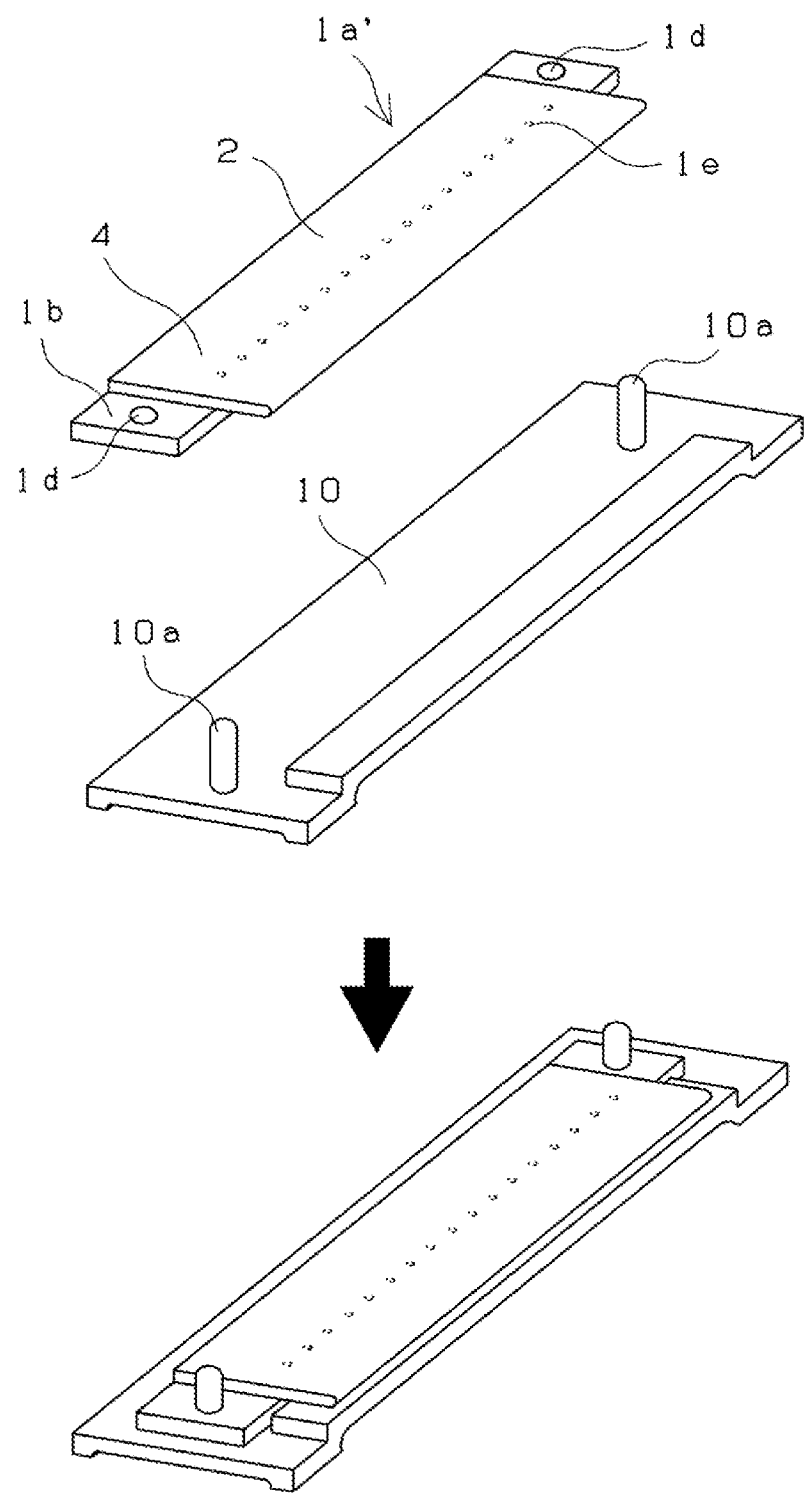
FIG. 8 is a view illustrating fixing of a base member onto a base.
Figure 9:
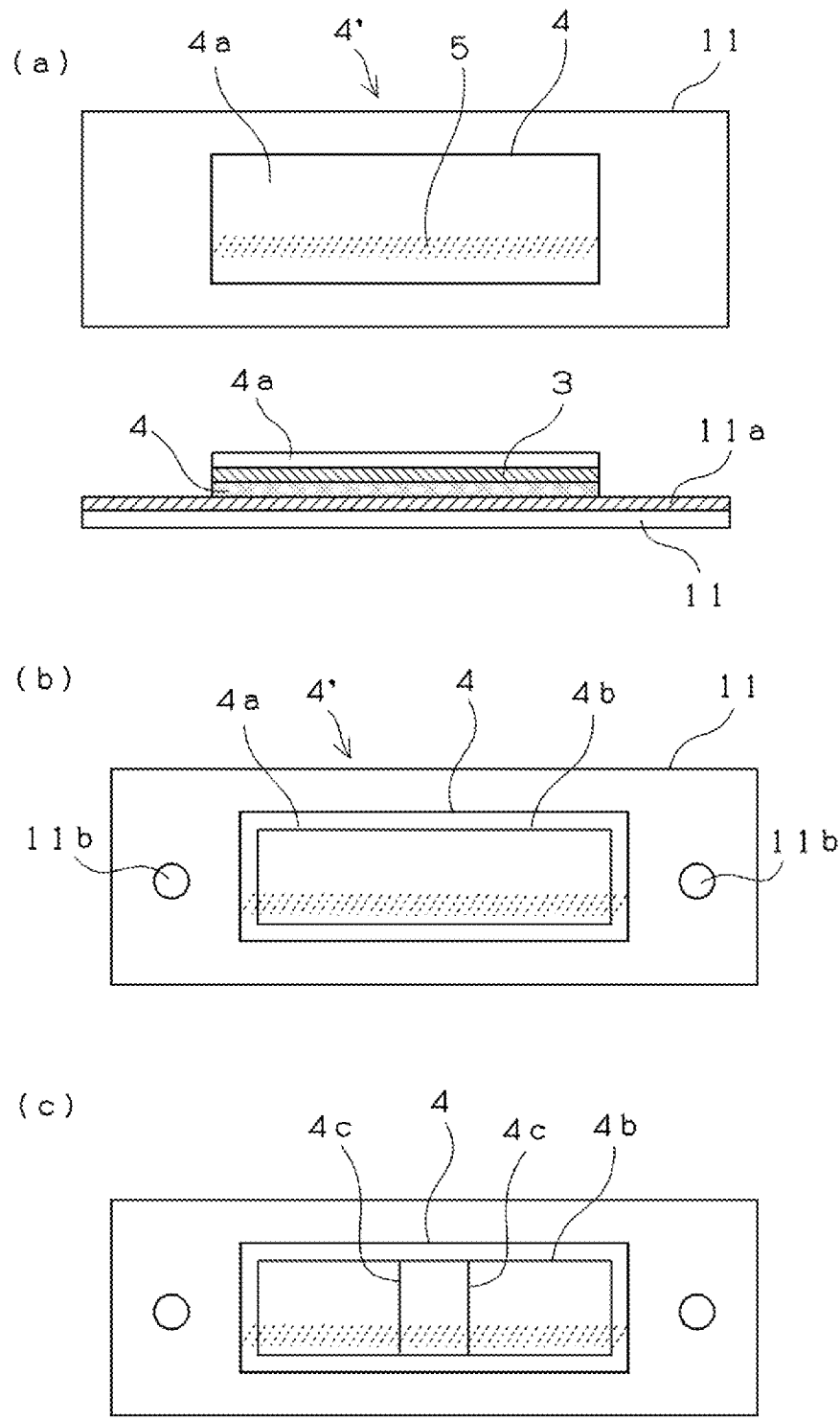
FIGS. 9(a) to 9(c) are views illustrating cutting of a resin film supported by a carrier sheet.

At first, as shown in FIG. 8, a base member 1a' formed by joining the metal plate 2 to the support member 1b by means of laser spot welding while leaving a free end portion is prepared. A reference numeral 1e corresponds to a welding mark of the laser spot welding. Next, two reference pins 10a of the base 10 which holds the base member 1a' are inserted into two holes 1d of the base member 1a'.

Figure 10:
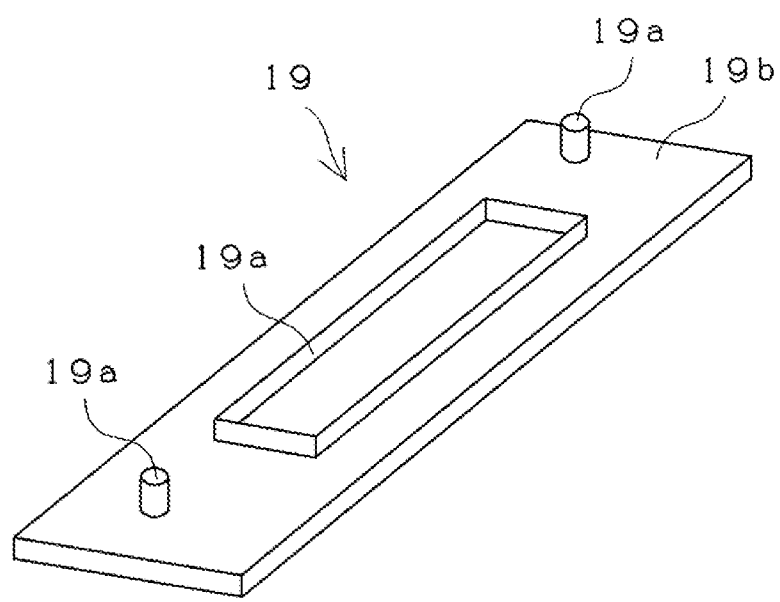
FIG. 10 is a view illustrating a cutting jig for the resin film.

As shown in FIG. 9(a), a carrier sheet 11 having an adhesive 11a is adhered to the paper passing side surface of the non-adhesive resin film 4 having the silicon adhesive 3 on the opposite paper passing side surface provided as an adhered surface to metal plate, the non-adhesive resin film 4 having the pattern portion 5 formed on the paper passing side surface in the preceding step, and a composite film 4' formed by the non-adhesive resin film 4 and the carrier sheet 11 is prepared. A reference numeral 4a corresponds to a release paper. Further, in FIG. 9(a), an upper figure is a plane view, and a lower figure is a side view. Next, as shown in FIG. 10, a cutting jig 19 is prepared. In the cutting jig 19, a Thomson blade 19a is fixed on a wood frame 19b at a position corresponding to an outer circumference shape of the non-adhesive resin film adhered to the metal plate and the reference pins of the base. As shown in FIG. 9(b), a cut 4b corresponding to an outer circumference shape of the non-adhesive resin film adhered to the metal plate is formed by making a cut on the release paper 4a and the non-adhesive resin film 4 from a side of the non-adhesive resin film 4 the composite film 4' by using the cutting jig. At that time, the cut is not formed on the carrier sheet 11. Further, at the same time, a reference hole 11b corresponding to the reference pin is formed in the carrier sheet 11. After that, as shown in FIG. 9(c), two cuts 4c are further formed at a center portion of the non-adhesive resin film 4 of the composite film 4' having the cut.

Figure 11:
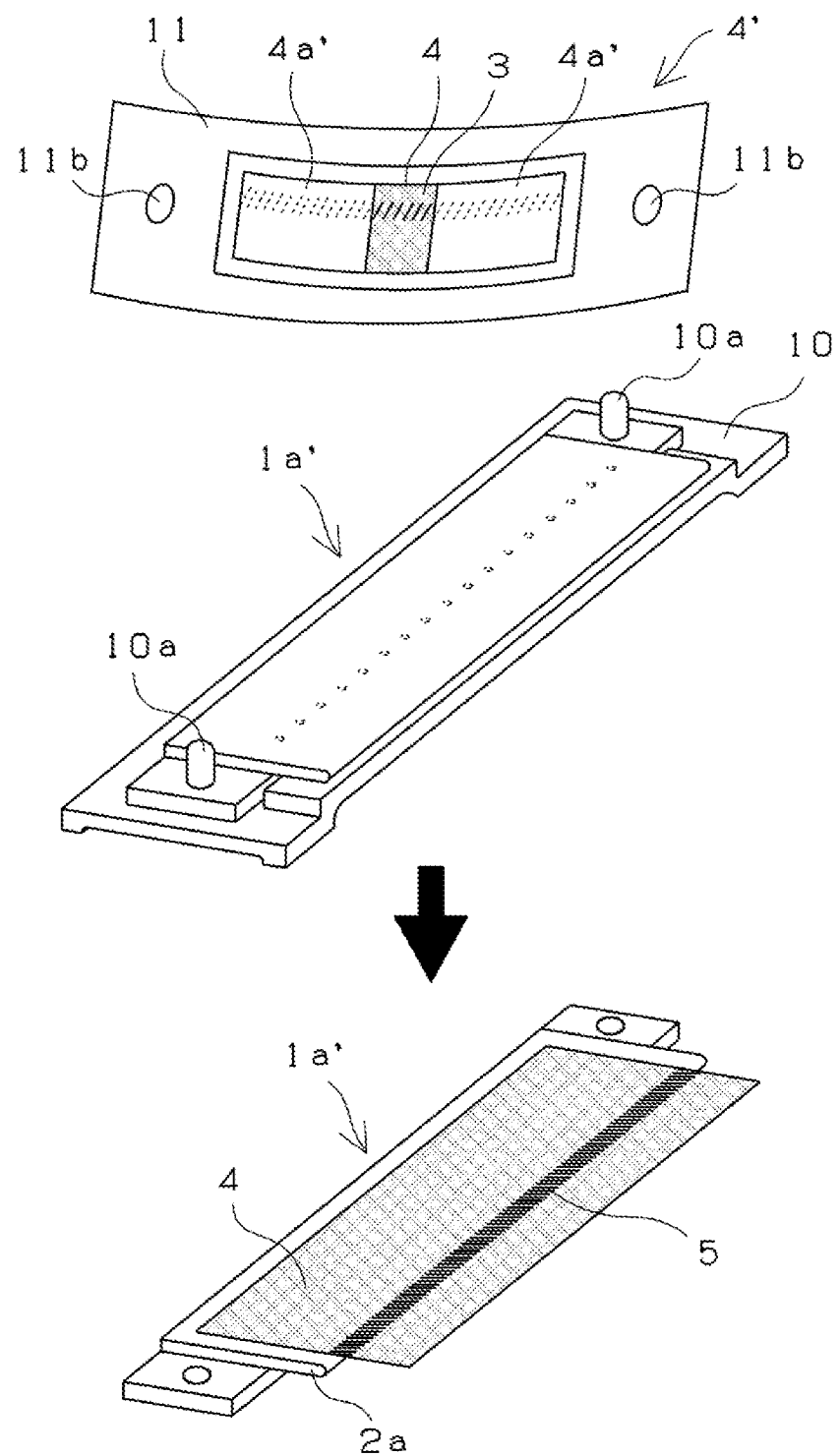
FIG. 11 is a view illustrating adhering of the resin film onto the base member.

The release paper of the center portion of the composite film is removed. As shown in FIG. 11, the composite film 4' having the cut is arranged on the base member 1a' held by the base 10 such that the reference pin 10a of the base 10 is inserted into the reference hole 11b. At this time, the center portion of the composite film 4' is adhered and fixed to the base member 1a' in advance. Next, the release paper 4a' at both sides of the center portion is removed, and the both sides of the center portion are adhered and fixed to the base member 1a'. Next, the carrier sheet 11 of the composite film 4' on the base 10 is removed from the non-adhesive resin film 4, and thereafter the base member 1a' is released to which the non-adhesive resin film 4 is adhered is released from base 10.

Figure 12:
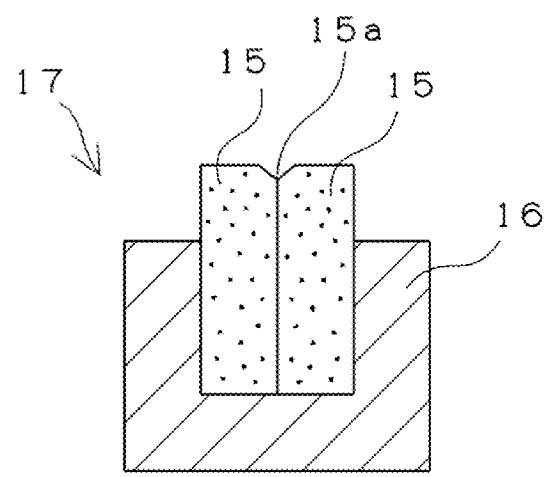
FIG. 12 is a view illustrating a folding jig.
Figure 13:
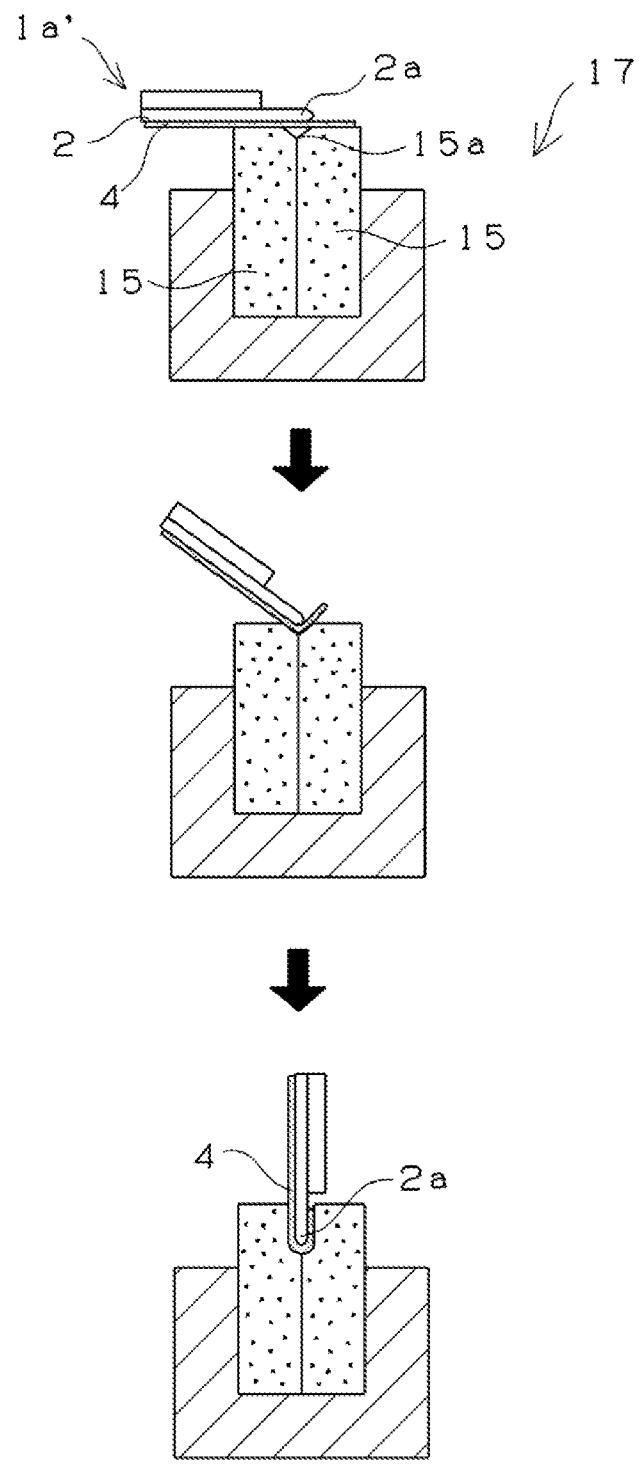
FIG. 13 is a view illustrating a step of adhering the resin film onto a distal end portion of a metal plate by using the folding jig.
Figure 14:
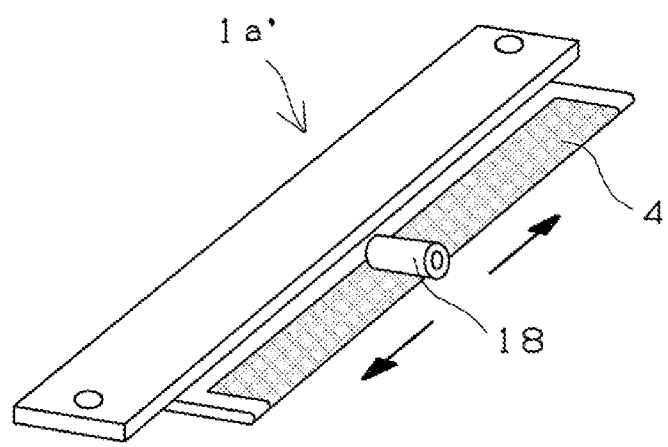
FIG. 14 is a view illustrating fixing of the folded resin film by a roller.

As shown in FIG. 12, a folding jig 17 in which two sponge bodies 15 longer than a length of the base member in a longitudinal direction arranged to stand adjacent to each other are held by a retainer 16 is prepared. The sponge body 15 is formed as a flexible body and formed of foamed flexible resin or the like. As shown in FIG. 13, the distal end portion 2a of the metal plate 2 in the base member 1a' to which the non-adhesive resin film 4 is adhered is pressed and inserted into a gap between the sponge bodies together with the non-adhesive resin film 4 from a gap notched portion 15a between the two sponge bodies 15 (a shape in which upper side end portions of the sponge bodies contacted with each other are notched) without allowing an air bubble to enter. With this, the non-adhesive resin film 4 is adhered to cover the both surfaces of the distal end portion 2a. At last, as shown in FIG. 14, the base member 1a' is released from the folding jig, and the non-adhesive resin film 4 is pressed and fixed from the center portion toward right and left by using roller 18, and the peeling sheet is completed.

By adopting such a film adhering step, in a case in which the non-adhesive resin film in which the recessed grooves are formed on the surface by means of transferring and pressing is used, the non-adhesive resin film can be adhered with high accuracy, and existence of a crinkle or an air bubble in the non-adhesive resin film can be suppressed as much as possible.

INDUSTRIAL APPLICABILITY

The manufacturing method for the peeling member in which the non-adhesive resin film formed by fluororesin resin or the like is adhered to a metal plate according to the present invention is capable of manufacturing the peeling member, which can prevent adhesion of a paper right after fixing for a long period of time, with high productivity and without variations in quality, and thereby the manufacturing method is suitably used for a peeling member which peels a paper from a roller such as a fixing roller arranged in an electronic photographic device.

EXPLANATION OF REFERENCE NUMERALS AND SYMBOLS

1: peeling member
2: metal plate
3: silicon adhesive
4: non-adhesive resin film
5: pattern portion formed by a plurality of recessed grooves
6: fixing roller
7: pressing roller
8: nip portion
9: paper
10: base
11: carrier sheet
12: rotation member
13: urethane rubber roller
14: pressing die
15: sponge body
16: retainer
17: folding jig
18: roller
19: cutting jig

The invention claimed is:

1. A manufacturing method for a peeling member provided with a peeling sheet formed by a metal plate and a non-adhesive resin film adhered to the metal plate, the peeling member configured to peel a paper from a fixing member of an electronic photographic device by making a distal end portion, which is an end portion at a side of one of long sides of the peeling sheet, contact with or close to the fixing member, the manufacturing method for the peeling member comprising:
   a groove forming step of forming a plurality of recessed grooves on at least a part of a paper passing side surface of the non-adhesive resin film along a longitudinal direction of the non-adhesive resin film before the non-adhesive resin film is adhered to the metal plate; and
   a film adhering step of adhering the non-adhesive resin film obtained in the groove forming step such that the recessed grooves are arranged along at least a longitudinal direction of a distal end portion of the passing side surface of the metal plate.

2. The manufacturing method for the peeling member according to claim 1, wherein the groove forming step is a step of interposing and continuously pressing the non-adhesive resin film by a rubber roller and a rotation member, which can transfer a shape of a recessed groove, to form the recessed grooves.

3. The manufacturing method for the peeling member according to claim 2, wherein an outer circumference surface of the rotation member is formed in a helical gear shape, and the recessed grooves are formed by linear grooves transferred from the helical gear shape to be inclined along a certain direction against a paper passing direction and arranged at certain intervals.

4. The manufacturing method for the peeling member according to claim 1, further comprising a step of cutting the non-adhesive resin film having a shape in which the recessed grooves are arranged along the longitudinal direction of the distal end portion from a continuous film material in which the recessed grooves are formed, after the groove forming step and before the film adhering step.

5. The manufacturing method for the peeling member according to claim 1, wherein the non-adhesive resin film has an adhesive layer on an opposite surface from the paper passing side surface, and the film adhering step is a step of adhering the non-adhesive resin film, after arranging a distal end portion of the metal plate at a side of the adhesive layer of the non-adhesive resin film such that an end portion of the non-adhesive resin film is protruded from the distal end portion of the metal plate, by pushing the distal end portion of the metal plate together with the non-adhesive resin film into a gap between two flexible bodies adjacent to each other to cover both surfaces of the distal end portion of the metal plate.

\* \* \* \* \*